United States Patent
McCaffrey (10) Patent No.: US 10,138,749 B2
(45) Date of Patent: Nov. 27, 2018

(54) SEAL ANTI-ROTATION FEATURE

(71) Applicant: UNITED TECHNOLOGIES CORPORATION, Farmington, CT (US)

(72) Inventor: Michael G. McCaffrey, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/071,352

(22) Filed: Mar. 16, 2016

(65) Prior Publication Data

US 2017/0268367 A1    Sep. 21, 2017

(51) Int. Cl.
| F01D 11/08 | (2006.01) |
| F16J 15/34 | (2006.01) |
| F01D 5/28 | (2006.01) |
| F01D 9/04 | (2006.01) |

(Continued)

(52) U.S. Cl.
CPC .............. *F01D 11/08* (2013.01); *F01D 5/284* (2013.01); *F01D 9/04* (2013.01); *F01D 11/12* (2013.01); *F01D 11/122* (2013.01); *F01D 25/246* (2013.01); *F16J 15/3464* (2013.01); *F05D 2220/32* (2013.01); *F05D 2240/11* (2013.01); *F05D 2260/30* (2013.01); *F05D 2300/2261* (2013.01); *F05D 2300/2283* (2013.01)

(58) Field of Classification Search
CPC ........ F01D 11/08; F01D 11/12; F01D 11/122; F01D 11/127; F01D 25/24; F01D 25/246
See application file for complete search history.

(56) References Cited

U.S. PATENT DOCUMENTS

| 3,892,497 A * | 7/1975 | Gunderlock | ............ F01D 9/042 415/134 |
| 4,087,199 A * | 5/1978 | Hemsworth | ............ F01D 11/08 415/173.3 |

(Continued)

FOREIGN PATENT DOCUMENTS

| EP | 1076161 A2 | 2/2001 |
| WO | 2015038341 A1 | 3/2015 |

(Continued)

OTHER PUBLICATIONS

European Search Report for European Application No. 17160060.4 dated Jul. 18, 2017.

*Primary Examiner* — Kristina R Fulton
*Assistant Examiner* — L. Susmitha Koneru
(74) *Attorney, Agent, or Firm* — Carlson, Gaskey & Olds, P.C.

(57) ABSTRACT

A seal assembly includes a seal arc segment defining first and second seal supports. A carriage defines first and second support members with the first support member supporting the seal arc segment in a first ramped interface and the second support member supporting the seal arc segment in a second ramped interface such that the seal arc segment is circumferentially moveable with respect to the carriage. The seal assembly includes an anti-rotation interface in which the seal arc segment and the carriage are engaged. The anti-rotation interface restricts circumferential movement of the seal arc segment.

18 Claims, 5 Drawing Sheets

(51) Int. Cl.
*F01D 11/12* (2006.01)
*F01D 25/24* (2006.01)

(56) References Cited

U.S. PATENT DOCUMENTS

| | | | | |
|---|---|---|---|---|
| 4,394,022 A | * | 7/1983 | Gilmore | F16J 15/02 277/377 |
| 4,436,311 A | * | 3/1984 | Brandon | F01D 11/025 277/413 |
| 4,522,559 A | * | 6/1985 | Burge | F01D 25/26 415/138 |
| 4,527,385 A | | 7/1985 | Jumelle et al. | |
| 4,728,257 A | * | 3/1988 | Handschuh | F01D 11/24 415/136 |
| 5,165,848 A | * | 11/1992 | Plemmons | F01D 25/145 29/888.01 |
| 5,195,868 A | * | 3/1993 | Plemmons | F01D 25/145 29/525.02 |
| 5,374,068 A | * | 12/1994 | Jewett | F16J 15/441 277/303 |
| 5,609,469 A | | 3/1997 | Worley et al. | |
| 5,618,161 A | * | 4/1997 | Papageorgiou | F01D 9/042 415/190 |
| 5,639,210 A | | 6/1997 | Carpenter et al. | |
| 5,709,388 A | * | 1/1998 | Skinner | F01D 11/025 277/412 |
| 6,142,731 A | * | 11/2000 | Dewis | F01D 11/08 277/416 |
| 6,406,256 B1 | * | 6/2002 | Marx | F01D 11/08 415/138 |
| 6,431,825 B1 | | 8/2002 | McLean | |
| 6,695,316 B2 | * | 2/2004 | Popa | F16J 15/442 277/411 |
| 6,726,448 B2 | | 4/2004 | McGrath et al. | |
| 6,733,235 B2 | | 5/2004 | Alford et al. | |
| 7,052,235 B2 | | 5/2006 | Alford et al. | |
| 7,163,206 B2 | | 1/2007 | Cross et al. | |
| 7,435,049 B2 | | 10/2008 | Ghasripoor et al. | |
| 7,527,472 B2 | | 5/2009 | Allen | |
| 7,959,407 B2 | | 6/2011 | Tholen | |
| 8,123,466 B2 | | 2/2012 | Pietraszkiewicz et al. | |
| 8,303,247 B2 | | 11/2012 | Schlichting et al. | |
| 8,439,636 B1 | | 5/2013 | Liang | |
| 8,534,995 B2 | | 9/2013 | McCaffrey | |
| 8,568,091 B2 | | 10/2013 | McCaffrey | |
| 8,585,357 B2 | | 11/2013 | DiPaola et al. | |
| 8,596,963 B1 | | 12/2013 | Liang | |
| 8,790,067 B2 | | 7/2014 | McCaffrey et al. | |
| 8,794,911 B2 | * | 8/2014 | Murphy | F01D 9/042 415/191 |
| 8,834,113 B2 | * | 9/2014 | Schaus | F01D 9/041 415/209.2 |
| 8,876,458 B2 | | 11/2014 | Thibodeau et al. | |
| 8,920,127 B2 | | 12/2014 | McCaffrey | |
| 8,944,756 B2 | | 2/2015 | Lagueux | |
| 9,039,358 B2 | | 5/2015 | Tholen et al. | |
| 9,115,596 B2 | | 8/2015 | Clouse | |
| 9,169,739 B2 | * | 10/2015 | Mironets | F01D 11/12 |
| 9,175,579 B2 | * | 11/2015 | Franks | F01D 25/246 |
| 9,200,530 B2 | | 12/2015 | McCaffrey | |
| 9,228,447 B2 | | 1/2016 | McCaffrey | |
| 9,347,327 B2 | * | 5/2016 | Armstrong | F01D 9/00 |
| 2005/0281694 A1 | * | 12/2005 | Rogers | F01D 9/04 417/423.14 |
| 2006/0038358 A1 | | 2/2006 | James | |
| 2008/0211192 A1 | | 9/2008 | Pietraszkiewicz et al. | |
| 2009/0096174 A1 | | 4/2009 | Spangler et al. | |
| 2009/0169368 A1 | | 7/2009 | Schlichting et al. | |
| 2009/0208322 A1 | | 8/2009 | McCaffrey | |
| 2010/0226760 A1 | | 9/2010 | McCaffrey | |
| 2011/0044803 A1 | | 2/2011 | Di Paola et al. | |
| 2011/0044804 A1 | * | 2/2011 | DiPaola | F01D 9/04 415/173.1 |
| 2012/0195743 A1 | | 8/2012 | Walunj et al. | |
| 2012/0275898 A1 | | 11/2012 | McCaffrey et al. | |
| 2013/0017057 A1 | | 1/2013 | Lagueux | |
| 2013/0022469 A1 | | 1/2013 | McCaffrey | |
| 2013/0113168 A1 | | 5/2013 | Lutjen et al. | |
| 2013/0209240 A1 | * | 8/2013 | McCaffrey | F01D 11/22 415/173.2 |
| 2014/0001753 A1 | * | 1/2014 | Vandal | F16L 17/04 285/337 |
| 2014/0016761 A1 | | 1/2014 | Werner | |
| 2014/0017072 A1 | | 1/2014 | McCaffrey | |
| 2014/0023480 A1 | | 1/2014 | McCaffrey | |
| 2014/0033149 A1 | | 1/2014 | Groves et al. | |
| 2014/0044528 A1 | | 2/2014 | Clouse | |
| 2014/0053040 A1 | | 2/2014 | Hargan | |
| 2014/0127006 A1 | | 5/2014 | Romanov et al. | |
| 2014/0133955 A1 | | 5/2014 | McCaffrey et al. | |
| 2014/0186152 A1 | | 7/2014 | McCaffrey et al. | |
| 2014/0271146 A1 | * | 9/2014 | Dietrich | F04D 29/644 415/173.1 |
| 2015/0016954 A1 | | 1/2015 | Thibodeau et al. | |
| 2015/0031764 A1 | | 1/2015 | Kraus et al. | |
| 2015/0226132 A1 | | 8/2015 | Thill et al. | |
| 2015/0337672 A1 | | 11/2015 | McCaffrey et al. | |
| 2015/0369076 A1 | | 12/2015 | McCaffrey et al. | |
| 2016/0003078 A1 | | 1/2016 | Stevens et al. | |
| 2016/0003080 A1 | | 1/2016 | Mcgarrah | |
| 2016/0130963 A1 | * | 5/2016 | Wilson | F01D 11/001 60/805 |
| 2016/0208629 A1 | * | 7/2016 | Bergman | F01D 11/08 |
| 2016/0333715 A1 | * | 11/2016 | McCaffrey | F01D 25/246 |

FOREIGN PATENT DOCUMENTS

| | | |
|---|---|---|
| WO | 2015038906 | 3/2015 |
| WO | 2015047478 | 4/2015 |
| WO | 2015061108 | 4/2015 |
| WO | 2015088656 | 6/2015 |
| WO | 2015109292 | 7/2015 |
| WO | 2015109292 A1 | 7/2015 |
| WO | 2015112354 | 7/2015 |

\* cited by examiner

SEAL ANTI-ROTATION FEATURE

BACKGROUND

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged. The arc segments may be abradable to reduce the radial gap with the tips of the blades.

SUMMARY

A seal assembly according to an example of the present disclosure includes a seal arc segment that defines first and second seal supports, a carriage that defines first and second support members with the first support member supporting the seal arc segment in a first ramped interface and the second support member supporting the seal arc segment in a second ramped interface such that the seal arc segment is circumferentially moveable with respect to the carriage, and an anti-rotation interface in which the seal arc segment and the carriage are engaged. The anti-rotation interface restricts circumferential movement of the seal arc segment.

In a further embodiment of any of the foregoing embodiments, the anti-rotation interface comprises a rib and a slot.

In a further embodiment of any of the foregoing embodiments, the seal arc segment defines the rib.

In a further embodiment of any of the foregoing embodiments, the carriage defines the slot.

In a further embodiment of any of the foregoing embodiments, the slot is defined by a key received in a body of the carriage.

In a further embodiment of any of the foregoing embodiments, the anti-rotation interface is within the middle circumferential third of the seal arc segment.

In a further embodiment of any of the foregoing embodiments, the carriage is disposed substantially radially outward of the at least one seal segment.

In a further embodiment of any of the foregoing embodiments, the first carriage support is radially inward of the first seal support and the second carriage support is radially inward of the second seal support.

In a further embodiment of any of the foregoing embodiments, the seal arc segment comprises ceramic.

In a further embodiment of any of the foregoing embodiments, the first and second carriage supports define the ramped interfaces.

In a further embodiment of any of the foregoing embodiments, the rib extends axially, and the circumferential distance from the first seal support to the rib is approximately equal to the circumferential distance from the second seal support to the rib.

A method of sealing a rotor assembly according to an example of the present disclosure includes providing a seal arc segment radially outward of a rotor, with respect to the axis of rotation of the rotor, where the seal arc segment defines first and second seal supports. The seal arc segment is supported on a carriage that defines first and second support members, the first support member supporting the seal arc segment in a first ramped interface and the second support member supporting the seal arc segment in a second ramped interface such that the seal arc segment is circumferentially moveable with respect to the carriage. A rib engages with a slot to restrict circumferential movement of the seal arc segment.

In a further embodiment of any of the foregoing embodiments, the seal arc segment defines the rib.

In a further embodiment of any of the foregoing embodiments, the carriage defines the slot.

In a further embodiment of any of the foregoing embodiments, the slot is defined by a key received in a body of the carriage.

A blade outer air seal according to an example of the present disclosure includes a seal body that defines a first support at a first circumferential end, a second support at a second circumferential end, and a mating feature circumferentially spaced from the first circumferential end and second circumferential end. The mating feature is configured to prevent circumferential rotation of the seal body.

In a further embodiment of any of the foregoing embodiments, the seal arc segment comprises ceramic.

In a further embodiment of any of the foregoing embodiments, the mating feature is an axially elongated rib.

In a further embodiment of any of the foregoing embodiments, the rib is disposed in a pocket at a radially outer portion of the seal body.

In a further embodiment of any of the foregoing embodiments, the seal body is monolithic.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
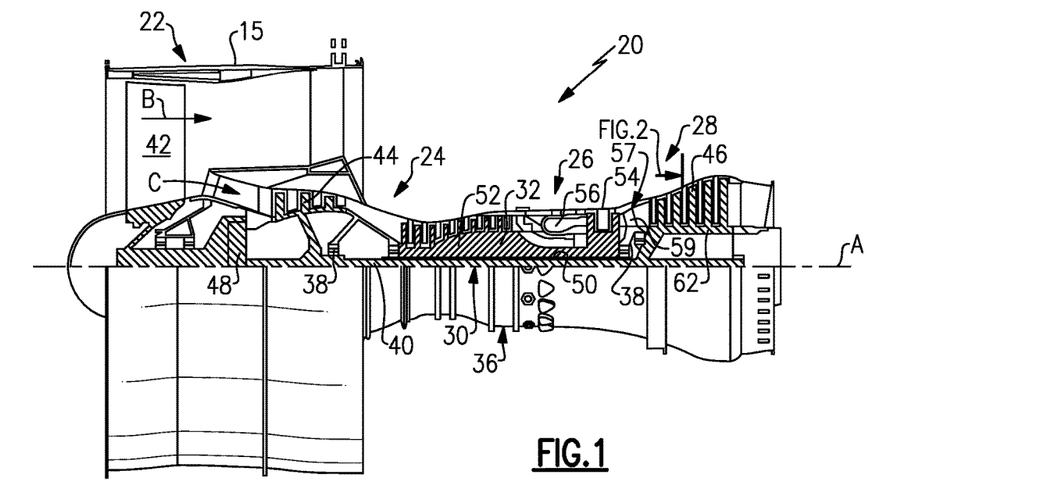
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 2:
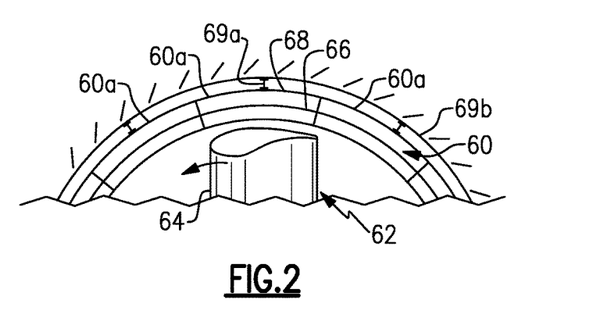
FIG. 2 illustrates an axial view of a seal assembly of a gas turbine engine.

FIG. 2 illustrates a partial axial view through a portion of one of the stages of the turbine section 28. In this example, the turbine section 28 includes an annular blade outer air seal (BOAS) system or assembly 60 (hereafter BOAS 60) that is located radially outwards of a rotor 62 that has a row of rotor blades 64. As can be appreciated, the BOAS 60 can alternatively or additionally be adapted for other portions of the engine 20, such as the compressor section 24. The BOAS 60 includes a plurality of segments 60a that are circumferentially arranged in an annulus around the central axis A of the engine 20. Each of the segments 60a generally includes a seal arc segment 66 that is mounted in a carriage or support 68. Each carriage 68 is mounted through one or more connections 69a to a case structure 69b. The BOAS 60 is in close radial proximity to the tips of the blades 64, to reduce the amount of gas flow that escapes around the blades 64.

Figure 3:
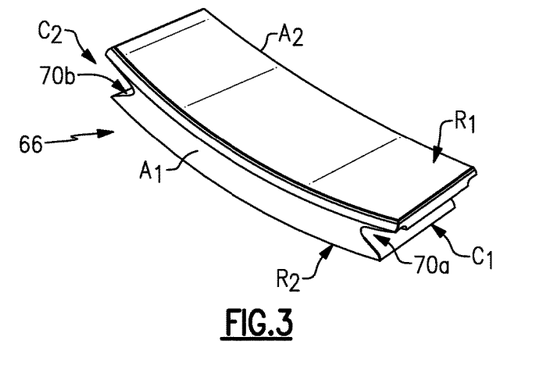
FIG. 3 illustrates an isolated view of a seal arc segment of a seal assembly.
Figure 4:
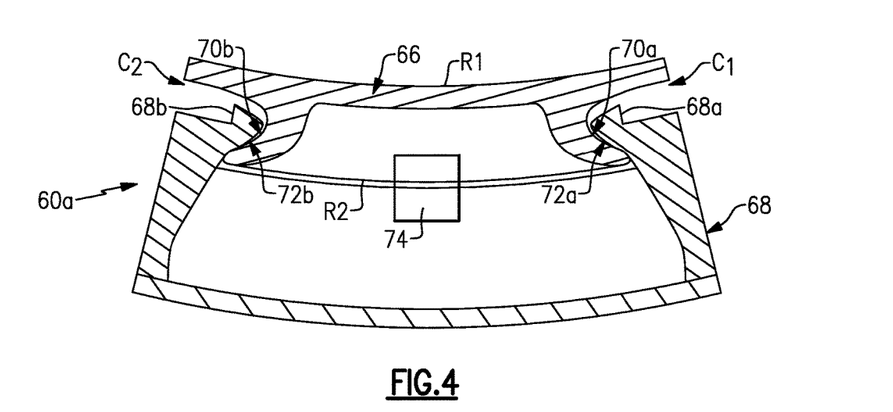
FIG. 4 illustrates an axial view of a segment of a seal assembly.

FIG. 3 illustrates an isolated view of a representative one of the seal arc segments 66, and FIG. 4 illustrates a sectioned view of a representative one of the segments 60a of the BOAS 60, including the carriage 68 and seal arc segment 66. As will be appreciated, the examples herein may be used to provide compliant, low-stress mounting of the seal arc segment 66 in the carriage 68. In particular such compliant low-stress mounting may be useful for seal arc segments 66 formed of materials that are sensitive to stress concentrations, although this disclosure is not limited and other types of seals and materials will also benefit.

Although not limited, the seal arc segments 66 (i.e., the body thereof) may be monolithic bodies that are formed of a high thermal-resistance, low-toughness material. For example, the seal arc segments 66 may be formed of a high thermal-resistance low-toughness metallic alloy or a ceramic-based material, such as a monolithic ceramic or a ceramic matrix composite. One example of a high thermal-resistance low-toughness metallic alloy is a molybdenumbased alloy. Monolithic ceramics may be, but are not limited to, silicon carbide (SiC) or silicon nitride ($Si_3N_4$). Alternatively, the seal arc segments 66 may be formed of high-toughness material, such as but not limited to metallic alloys.

Each seal arc segment 66 is a body that defines radially inner and outer sides R1/R2, first and second circumferential ends C1/C2, and first and second axial sides A1/A2. The radially inner side R1 faces in a direction toward the engine central axis A. The radially inner side R1 is thus the gas path side of the seal arc segment 66 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In this example, the first and second circumferential ends C1/C2 define, respectively, first and second seal supports 70a/70b by which the carriage 68 radially supports or suspends the seal arc segment 66. The seal arc segment 66 is thus end-mounted. In the example shown, the first and second seal supports 70a/70b have a dovetail geometry.

The carriage 68 includes first and second support members 68a/68b that serve to radially support the seal arc segment 66 via, respectively, the first and second seal supports 70a/70b. In the example shown, the first and second support members 68a/68b are hook supports that interfit with the dovetail geometry of the first and second seal supports 70a/70b.

The first support member 68a supports the seal arc segment 66 in a first ramped interface 72a and the second support member 68b supports the seal arc segment 66 in a second ramped interface 72b. For instance, each of the ramped interfaces 72a/72b includes at least one ramped surface on the seal arc segment 66, the carriage 68, or both. In the example shown, the surfaces of the first and second seal supports 70a/70b and the surfaces of the first and second support members 68a/68b are ramped. The term "ramped" as used herein refers to a support surface that is sloped with respect to both the radial and circumferential directions. The carriage 68 is thus substantially radially outward of the seal arc segment 66, except that the supports 68a/68b are radially inward of the supports 70a/70b of the seal arc segment 66.

The ramped interfaces 72a/72b permit the seal arc segment 66 to move circumferentially with respect to the carriage 68 as the seal arc segment 66 slides up and down the ramped interfaces 72a/72b. Friction in the ramped interfaces 72a/72b during sliding movement can potentially provide damping, and the relatively large contact area across the ramped interfaces 72a/72b distributes loads transferred through the ramped interfaces 72a/72b, which also serves to potentially reduce stress concentrations on the seal arc segment 66.

Figure 5:
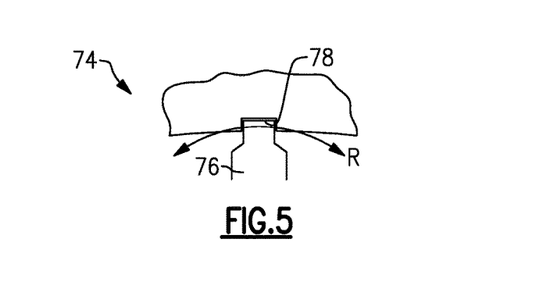
FIG. 5 illustrates an axial view of an example anti-rotation interface.

To limit or prevent circumferential rotation of the seal arc segment 66, an anti-rotation interface 74 is provided between the seal arc segment 66 and the carriage 68 (shown schematically). For example, the anti-rotation interface 74 includes a rib or retention post 76 and a slot 78 for receiving the rib 76 to limit circumferential rotation R, as illustrated in FIG. 5. The rib 76 may be provided by one of the seal arc segment 66 and the carriage 68, and the slot may be provided by the other of the seal arc segment 66 and the carriage 68.

Figure 6:
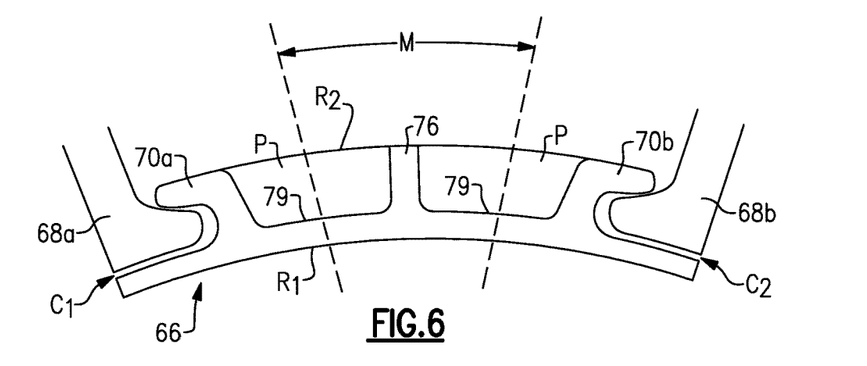
FIG. 6 illustrates an axial view of an example segment of a seal assembly.
Figure 7:
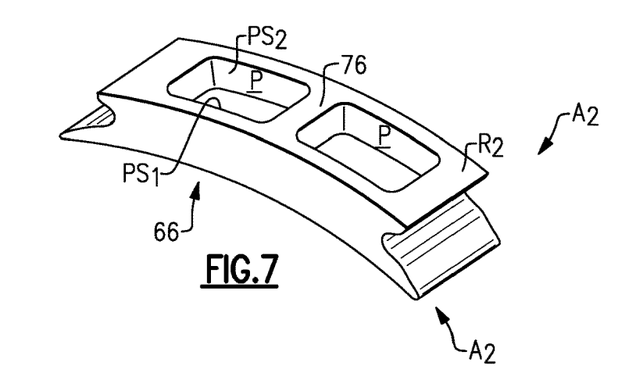
FIG. 7 illustrates a perspective view of an example seal arc segment.

As illustrated FIGS. 6 and 7, in one embodiment, the rib 76 is provided by the seal arc segment 66. In this embodiment, the slot 78 is provided by the carriage 68 (not shown). The rib 76 is circumferentially between the supports 70a/70b and extends radially outward from a radially inner surface 79 of a pocket P formed at the radially outer side R2. In one example, the rib 76 extends a radial distance such that the outer surface of the rib 76 is flush with surrounding edges of the radially outer side R2 of the arc segment 66.

The rib 76 extends axially, such that when it is received in an axially extending slot 78 of the static carriage 68, the interlocking of the rib 76 and slot 78 limits circumferential rotation of the seal arc segment 66. The rib 76 may extend axially from a first circumferentially and radially extending surface PS1 of the pocket P to a second opposite circumferentially and radially extending surface PS2. The rib 76 may extend axially across substantially the entire seal arc segment 66.

Figure 8:
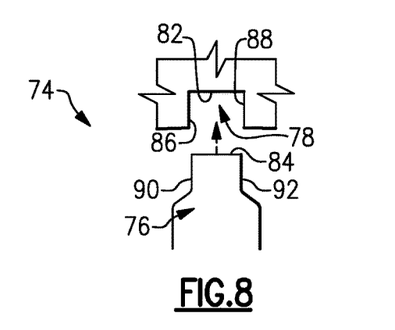
FIG. 8 illustrates an axial view of an example anti-rotation interface.

FIG. 8 illustrates the interface between the rib 76 and the slot 78. The slot 78 is provided by an axially and circumferentially extending surface 82, and two opposing radially and axially extending surfaces 86, 88. The rib 76 is provided by a circumferentially and axially extending surface 84 and two opposing radially and axially extending surfaces 90, 92. When the rib 76 and the slot 78 are engaged to provide an anti-rotation interface 74, the surface 82 of the slot 78 interfaces with the surface 84 of the rib 76. The surfaces 86 and 88 of the slot 78 interface with the surfaces 90 and 92 of the rib 76. When the rib 76 is received within the slot 78, the interfacing between surfaces 86 and 90 limits rotation in a first circumferential direction, and the interface between surfaces 88 and 92 prevents rotation in a second circumferential direction opposite the first circumferential direction.

In one example, the rib 76 is within the middle circumferential third M of the seal arc segment 66 (FIG. 6), such that the rib 76 is substantially central to the arc seal segment 66. A substantially central rib 76 allows for the thermal growth of the arc seal segment 66 to be centered circumferentially. Additionally, controlling the circumferential position from a central location minimizes the differential radial motion of the seal arc segment on the ramped interfaces 72a/72b, thus minimizing the radial clearance variation between the blade 64 tip and the seal arc segment surface R1. The circumferential distance from the first seal support 70a to the rib 76 may be approximately equal to the circumferential distance from the second seal support 70b to the rib 76.

Figure 9:
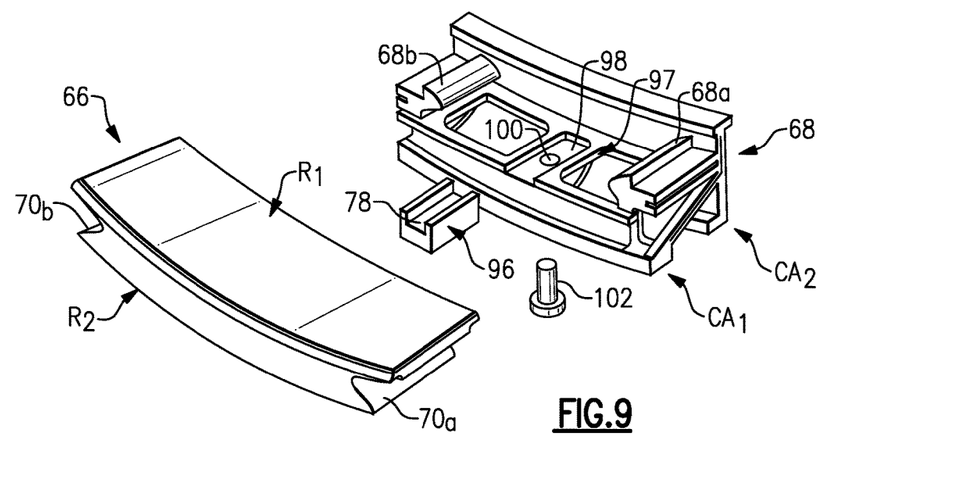
FIG. 9 illustrates an exploded view of an example segment of a seal assembly.

As illustrated in FIG. 9, the carriage may include a carriage body 97 and a key member 96, which provides the slot 78. The key member 96 may be a separate member attached to the carriage body 97. In one example, the key member 96 is placed onto the seal arc segment 66 such that the rib 76 of the seal arc segment 66 is received in the slot 78 of the key member 96. The joined seal arc segment 66 and key member 96 are then slid axially into the carriage 68 at an axial end CA1 toward an axial end CA2, such that the key member 96 is slid into an opening or longitudinal slot 98 in the carriage body 97. The opening 98 is open in cross-section at an axial end CA1 and extends toward axial end CA2 to receive the axial sliding of the key member 96 joined to the seal arc segment 66. The opening 98 may extend radially outward from a radially inner surface 99 of the carriage body 97.

As the carriage 68 receives the seal arc segment 66, the first and second support members 68a/68b engage the first and second seal supports 70a/70b. The support members 68a/68b provide radial support to prevent radially inward movement of the seal arc segment 66 that would be sufficient to disengage the rib 76 from the slot 78. The opening 98 may include a bore 100 for receiving a bolt 102 for fixing the key 96 to the carriage body 97, for example.

Figure 10:
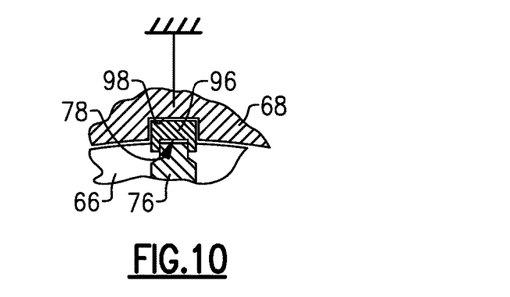
FIG. 10 illustrates an axial view of an example anti-rotation interface.

The engagement of the rib 76 and the key member 96 is further illustrated in FIG. 10. Fixing the key member 96 to the static carriage body 97 with the rib 76 of the seal arc segment 66 received within the slot 78 of the key 96 limits circumferential rotation of the seal arc segment 66.

Figure 11:
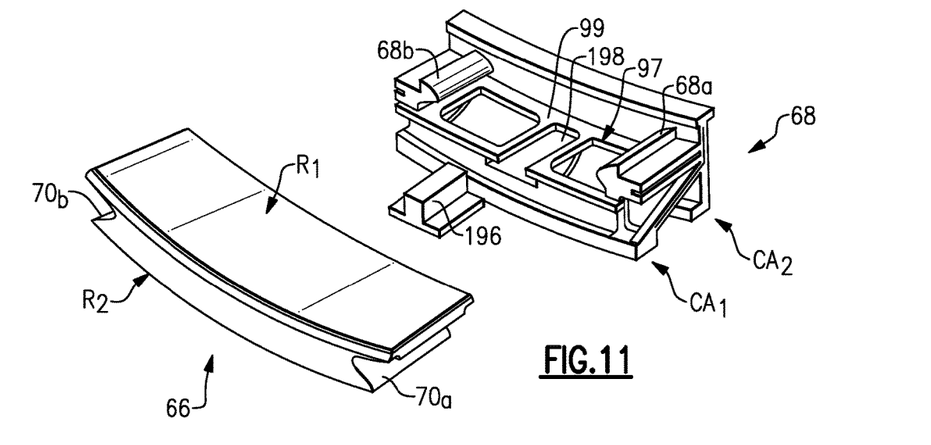
FIG. 11 illustrates an exploded view of an example segment of a seal assembly.
Figure 12:
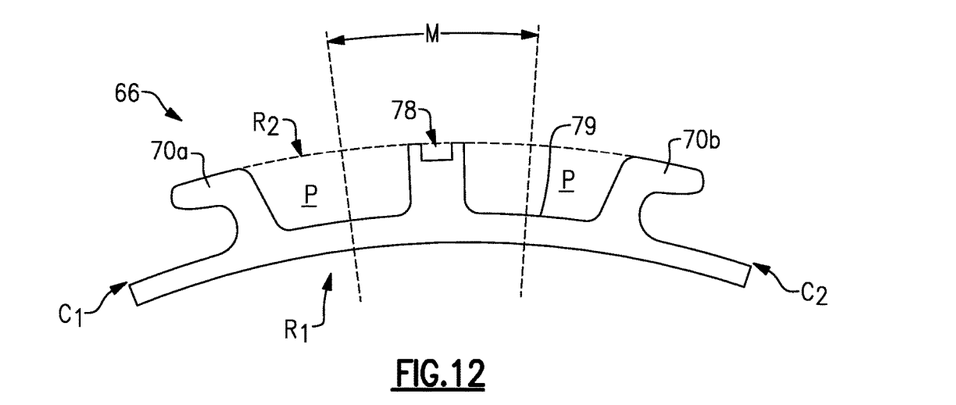
FIG. 12 illustrates an axial view of an example seal arc segment.

As illustrated in FIGS. 11 and 12, in another example, the key 196 provides the rib 76 of the anti-rotation interface 74. The key 196 may be T-shaped in cross-section, and the corresponding opening 198 and the carriage 68 is also T-shaped in cross-section. The seal arc segment 66 provides the slot 78, one example being shown in FIG. 12. The rib 76 of the key 196 is thus received in the slot 78 of the seal arc segment 66. The slot 78 is circumferentially between the supports 70/7b and extends axially, as well as radially inward from the radially outer side R2 of the seal arc segment 66. As one alternative to the example shown in FIG. 12, the slot may extend farther radially inward to be even with the surface 79 of the pocket P, such that two circumferentially spaced ribs may provide the slot 78.

When the anti-rotation interface 74 is engaged, the rib 76 of the key 196 is received in the slot 78 by extending radially inward of the radially outer side R2 of the seal arc segment 66 into the slot 78. The slot 78 is within the middle circumferential third M of the seal arc segment 66, such that the slot 78 is substantially central to the arc seal segment 66. In another example, the circumferential distance from the first seal support 70a to the slot 78 may be approximately equal to the circumferential distance from the second seal support 70b to the slot 78.

After the rib 76 of the key member 196 is received the slot 78, the seal arc segment 66 may be slid axially into the carriage 68, beginning at the axial end CA1 and toward axial end CA2, such that the key member 196 slides into the corresponding opening 198 of the carriage body. The opening 198 is open at the axial end CA1 in cross section and extends axially toward the axial end CA2 to accommodate the axial sliding of the key 196 joined with the seal arc segment 66 through the axial end CA1 of the carriage 68. The opening 198 may extend radially outward from a radially inner surface 99 of the carriage body 97.

As the carriage 68 receives the seal arc segment 66, the first and second support members 68a/68b engage the first and second seal supports 70a/70b. The support members 68a/68b provide radial support to prevent radially inward movement of the seal arc segment 66 that would be sufficient to disengage the rib 76 from the slot 78. Fixing the key member 196 to the static carriage body 97 with the rib 76 engaged with the slot 78 of the seal arc segment 66 prevents circumferential rotation of the seal arc segment 66.

The anti-rotation interface 74 can reduce tilting or rotation of the arc seal segment 66 relative to the carriage 68, thereby reducing asymmetrical loading, asymmetrical thermal growth, and wear on supports 70a/70b of the seal arc segment 66. By adding a central anti rotation interface 74, the seal arc segment 66 can be positioned such that circumferential forces on the seal arc segment 66 are opposed by reaction forces of the anti-rotation interface 74, thus keeping the BOAS in the proper position during all operating conditions including blade rub. The seal arc segment 66 can then grow thermally independently of the case and support structure, while limiting the variation in seal arc segment 66 to seal arc segment 66 end gap variation around the circumference of the engine.

When ceramic is utilized as the material for the seal arc segment 66, the pocket P and rib 76 may be machined in the bisque state—the state before sintering to form the final densified ceramic, but after an intermediate heat treatment to the green state material. In the bisque state, the ceramic is relatively soft such that simple machining operations can be used to achieve desired shapes, unlike in the sintered state—where diamond tools are required for such machining operations.

The examples herein also illustrate a method for maintaining positioning in the BOAS 60. For example, the method includes providing a seal arc segment 66 radially outward of a rotor 62. The seal arc segment 66 is supported on a carriage 68. The first and second support members 68a/68b of the carriage support the seal arc segment 66 at ramped interfaces 72a/72b. A rib 76 is engaged with a slot 78 to restrict circumferential movement of the seal arc segment 66.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

I claim:

1. A seal assembly, comprising:
a monolithic seal arc segment having a first circumferential end defining a first seal support and a second circumferential end defining a second seal support, wherein the first circumferential end is circumferentially spaced from the second circumferential end with respect to the seal arc segment;
a carriage defining first and second support members, the first support member supporting the seal arc segment in a first ramped interface and the second support member supporting the seal arc segment in a second ramped interface such that the seal arc segment is circumferentially moveable with respect to the carriage, wherein the seal arc segment includes a radially outer side for interfacing with the carriage and a radially inner surface radially opposite the radially outer side and configured to bound a core gas flow path; and
an anti-rotation interface in which the seal arc segment and the carriage are engaged, the anti-rotation interface restricting circumferential movement of the seal arc segment.

2. The seal assembly as recited in claim 1, wherein the anti-rotation interface comprises a rib and a slot, the seal arc segment defines the rib, and the carriage defines the slot.

3. The seal assembly as recited in claim 1, wherein the anti-rotation interface comprises a rib and a slot, the seal arc segment defines the rib, and the slot is defined by a key received in a body of the carriage.

4. The seal assembly as recited in claim 1, wherein the anti-rotation interface is within the middle circumferential third of the seal arc segment.

5. The seal assembly as recited in claim 1, wherein the carriage is disposed substantially radially outward of the at least one seal segment.

6. The seal assembly as recited in claim 5, wherein
the first carriage support is radially inward of the first seal support, and the second carriage support is radially inward of the second seal support.

7. The seal assembly as recited in claim 1, wherein the seal arc segment comprises ceramic.

8. A method of sealing a rotor assembly, comprising:
providing a plurality of monolithic seal arc segments radially outward of a rotor, with respect to the axis of rotation of the rotor, each of the plurality of seal arc segments defining first and second seal supports;
each of the plurality of monolithic seal arc segments having a first circumferential end defining the first seal support and a second circumferential end defining the second seal support, wherein the first circumferential end is circumferentially spaced from the second circumferential end with respect to the seal arc segment;
mounting a plurality of axially aligned carriages to a case structure:
supporting each of the plurality of seal arc segments on a respective one of the plurality of carriages, each of the plurality of carriages defining first and second support members, the first support member supporting the seal arc segment in a first ramped interface and the second support member supporting the seal arc segment in a second ramped interface such that each of the plurality of seal arc segments is circumferentially moveable with respect to the respective carriage; and
engaging a rib with a slot to restrict circumferential movement of each of the seal arc segments.

9. The method as recited in claim 8, wherein each seal arc segment defines the rib, and each carriage defines the slot.

10. The method as recited in claim 8, wherein the seal arc segment defines the rib, and the slot is defined by a key received in a body of the carriage.

11. A blade outer air seal, comprising:
a monolithic seal arc segment defining:
a first support at a first circumferential end,
a second support at a second circumferential end, wherein the first circumferential end is circumferentially spaced from the second circumferential end with respect to the seal arc segment,
a pocket defined by a radially outer portion of the seal arc segment and enclosed axially by a first axial side of the seal arc segment and a second axial side opposite the first axial side, and
an axially elongated rib disposed within the pocket and circumferentially spaced from the first circumferential end and second circumferential end, wherein the axially elongated rib is configured to prevent circumferential rotation of the seal body.

12. The blade outer air seal as recited in claim 11, wherein the seal arc segment comprises ceramic.

13. The blade outer air seal as recited in claim 11, wherein the rib extends axially from a first circumferentially and radially extending surface of the pocket to a second opposite circumferentially and radially extending surface.

14. The method as recited in claim 8, wherein a radially inner surface of the seal arc segment is positioned to bound a gas flow path across blades of the rotor.

15. The seal assembly as recited in claim 2, wherein the seal arc segment defines a pocket at the radially outer side, and the rib extends axially from a first circumferentially and radially extending surface of the pocket to a second circumferentially and radially extending surface of the pocket.

16. The blade outer air seal as recited in claim 11, wherein the rib extends axially from a first circumferentially and radially extending surface of the seal arc segment to a second opposite circumferentially and radially extending surface of the seal arc segment, and the first circumferentially and radially extending surface and the second circumferentially and radially extending surface axially enclose the pocket.

17. The blade outer air seal as recited in claim 16, wherein the first support and second support extend circumferentially away from one another.

18. The seal assembly as recited in claim 1, comprising:
a key that is T-shaped in cross section and received in a corresponding opening in the carriage, wherein the key defines a rib of the anti-rotation interface, and the seal arc segment defines a slot of the anti-rotation interface that receives the rib.

* * * * *